UNITED STATES PATENT OFFICE.

ROBERT NICOL LENNOX, OF LONDON, ENGLAND.

PROCESS OF MAKING AMMONIUM NITRATE.

SPECIFICATION forming part of Letters Patent No. 597,006, dated January 11, 1898.

Application filed August 26, 1897. Serial No. 649,636. (No specimens.) Patented in England March 2, 1897, No. 5,483.

*To all whom it may concern:*

Be it known that I, ROBERT NICOL LENNOX, chemist, a subject of the Queen of Great Britain and Ireland, residing at Rosebank Works, Fulham, London, England, have invented a certain Process for the Separation and Purification of Nitrate of Ammonia, (for which I have obtained British patent, No. 5,483, dated March 2, 1897,) of which the following is a specification.

This invention consists in manufacturing and purifying nitrate of ammonia by a process involving the distillation of the salt *in vacuo* or under diminished pressure—that is to say, a pressure less than that of the atmosphere.

According to this invention I take sulfate of ammonia and mix it intimately with the nitrate of a metal capable of double decomposition—such, for example, as nitrate of soda. The salts are dried or used in their ordinary commercial condition and in or about molecular proportions—namely, seventeen parts, by weight, of nitrate of soda to thirteen parts, by weight, of sulfate of ammonia, a slight excess of either salt over the molecular proportions being preferable, owing to the fact that the dissociation of the ammonia salts is thereby diminished. The mixture of the salts is placed in a closed vessel or retort, the interior of which is placed in connection with a pump or exhauster, by which the pressure inside the said vessel or retort (and also in the condenser, scrubber, and connecting-pipes, hereinafter mentioned) is reduced to as low a degree as convenient, and heat is then applied to the vessel or retort, so that the contents are slowly heated to such a temperature that the nitrate of ammonia formed distils off, it being condensed in a condenser which leads into a scrubber, with which the pump or exhauster is connected. In carrying out the process, after the vessel or retort is charged with the mixture of the said salts the whole interior of the apparatus is put under *vacuo* or has the pressure reduced to below that of the atmosphere and heat is applied to the vessel or retort, care being taken that the contents thereof during the process of distillation are not heated to above 230° centigrade and that the upper part of the vessel or retort, which is filled with gaseous nitrate of ammonia and its products of dissociation and partial decomposition, is not superheated. At about 200° centigrade the nitrate of ammonia distils off, leaving the non-volatile sulfate of soda in the vessel or retort, and the said nitrate of ammonia is condensed in the condenser, which is made of earthenware pipes or other suitable material which will not be injured by the products. The vessel or retort may be made of iron or other material which will not be acted upon injuriously by the contents thereof and will not damage the product. I find that the best results are obtained by working at as low a pressure (or as high a vacuum) as can be conveniently maintained in practice—say, for example, a pressure equal to one inch of mercury; but a pressure even up to, say, about six inches of mercury may be employed without the destruction of a very material amount of the nitrate of ammonia. Any nitrous oxid produced during the process may be collected from the discharge from the pump or exhauster and be condensed into the liquid state.

Several vessels or retorts may with advantage be used, all distilling into the same condenser, so that one or more of such vessels or retorts may at different stages of the heating always be in operation.

A slight leak of air, ammonia, or other gas which does not act detrimentally on the substances undergoing reaction may be allowed to enter the vessel or retort or vessels or retorts during the distillation, provided the exhaustion be well maintained in spite of the leak.

The scrubber is charged with a strong solution of nitrate of ammonia or other material capable of absorbing any nitric acid and ammonia which may result from dissociation of nitrate of ammonia, so that vapors of neither nitric acid nor ammonia reach the pump or exhauster.

In order to remove the solid nitrate of ammonia from the condenser and to prevent obstruction in the pipes thereof, a jet of steam may be introduced into the condenser during the condensation.

The nitrate of ammonia may be completely purified by again distilling it *in vacuo* or under a pressure lower than that of the atmosphere and under conditions as to temperature as hereinbefore described.

I am aware that the volatilization or sublimation of nitrate of ammonia at atmospheric pressure is known, but this results in the destruction of such a large amount of the nitrate that it is not commercially available, and I am also aware that the double decomposition of a mixture of sulfate of ammonia and nitrate of soda is known, and I therefore do not claim these as novel.

Having now particularly described and ascertained the nature of my said invention and in what manner the same is to be performed, I declare that what I claim is—

The process of separating nitrate of ammonia from a mixture of sulfate of ammonia and nitrate of a metal capable of double decomposition, such as nitrate of soda, by distillation under pressure less than atmospheric pressure, and at a temperature such that material destruction of the nitrate of ammonia does not occur, substantially as described.

In testimony whereof I have signed my name to this specification in the presence of two subscribing witnesses.

ROBERT NICOL LENNOX.

Witnesses:
 RICH. BUNDS,
 JNO. E. NEWTON.